United States Patent [19]

Kusakabe et al.

[11] Patent Number: 4,960,968
[45] Date of Patent: Oct. 2, 1990

[54] BONDING METHOD OF BINDING STRAP END PORTIONS BY SPOT-WELDING

[75] Inventors: Kouichi Kusakabe; Ryozo Hayasaka, both of Kobe; Kanami Kato, Sakai, all of Japan

[73] Assignee: Signode Corporation, Glenview, Ill.

[21] Appl. No.: 396,952

[22] Filed: Aug. 21, 1989

[51] Int. Cl.$^5$ ............................................. B23K 11/10
[52] U.S. Cl. ................................. 219/78.01; 219/117.1
[58] Field of Search ............... 219/117.1, 78.01, 78.12; 228/4.5, 5.1, 5.7

[56] References Cited

FOREIGN PATENT DOCUMENTS 0172686 8/1986 Japan ................................. 219/117.1

Primary Examiner—Clifford C. Shaw
Attorney, Agent, or Firm—Schwartz & Weinrieb

[57] ABSTRACT

A method for bonding overlapped end portions of a binding strap encircled about articles to be bound and tightened to a tensioned state by means of a gripper disposed at a gripping station for gripping a leading end portion of the binding strap, and drive rollers driven in their reverse mode so as to retract a trailing end portion of the binding strap, comprises the steps of interposing a plate electrode between the article being bound and the overlapped portions of the binding strap, lowering a single electrode tip, disposed above the overlapped portions of the binding strap, into contact with the overlapped portions of the binding strap such that the latter is compressed between the electrode tip and the plate electrode, and energizing the electrodes so as to perform a spot-welding operation at a first location, upon said overlapped portions of the binding strap, which is remote from the gripping station. The electrode tip is then raised and moved to a second location closer to the gripping station at which the electrode tip is again lowered into contact with the overlapped portions of the binding strap such that the latter is against compressed between the two electrodes. Upon energization of the electrodes, a second spot-welding operation is performed. A cutter disposed at the gripping station is actuated, so as to sever the trailing end portion of the binding strap from the residual supply portion of the binding strap, either before or after performance of the second spot-welding operation. In either case, the second spot-welding operation is performed under essentially no-load or no-tension conditions.

4 Claims, 4 Drawing Sheets

FIG. 6
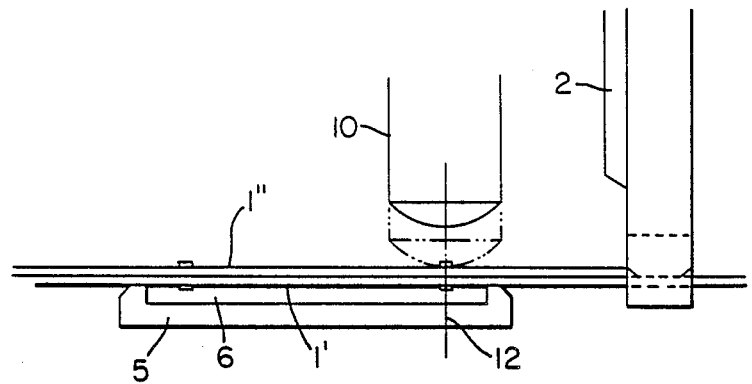
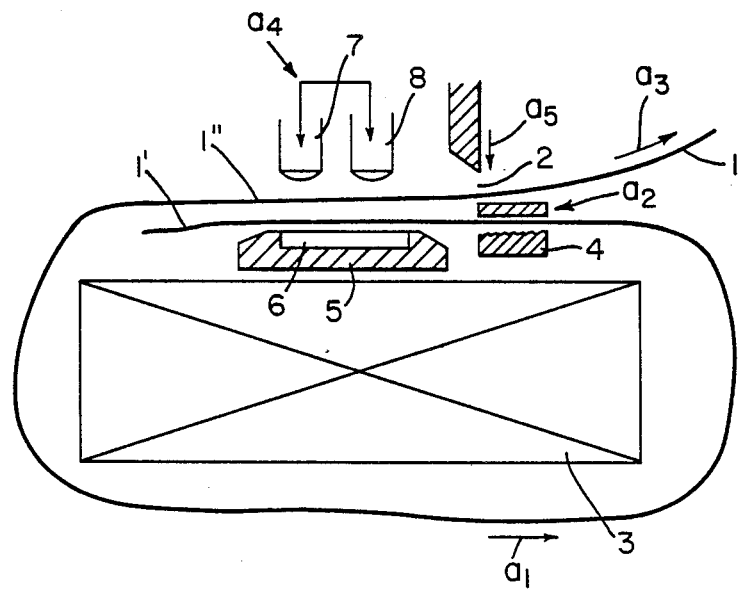
FIG. 7 (PRIOR ART)

BONDING METHOD OF BINDING STRAP END PORTIONS BY SPOT-WELDING

FIELD OF THE INVENTION:

The present invention relates generally to the field of binding articles by means of a tensioned encircling binding strap, such as, for example, a steel band, and more particularly to improvements in a method of bonding together the overlapped leading and trailing end portions of the binding strap by means of spot-welding techniques, the binding strap having, of course, been previously encircled around the articles to be bound, such as, for example, strip coils, tubes, stacked plates, and the like, and subsequently tightened and tensioned by means of driving rollers being driven in their reverse mode.

BACKGROUND OF THE INVENTION:

In order to bind articles by means of, for example, a steel band strap, the binding strap is fed from a supply source, by means of a binding head which has operatively disposed therein a plurality of drive rollers, or alternatively, the binding strap may be manually fed by means of a suitable hand tool, in such a manner as to entirely encircle the articles to be bound. When the leading end portion of the binding strap completely encircles the articles to be bound and approaches a trailing end portion of the binding strap within the vicinity of the location at which the leading end portion started to encircle the articles to be bound, such that the leading and trailing end portions of the binding strap are now overlapped with respect to each other, the leading end portion of the binding strap is gripped and held while the driving rollers are then driven in their reverse mode. Consequently, the trailing end portion of the binding strap is retracted, and the encircling binding strap is tightened and tensioned about the articles being bound to a predetermined degree. At this time, the overlapped leading and trailing end portions of the binding strap are bonded to each other, after which the binding strap is severed at a location upstream of the bonded region whereby the bound article is conveyed to another station or the like for further processing, such as, for example, its ultimate destination or transportation conveyance.

A seal fitment or crimped ferrule is one type of conventionally employed means for bonding the overlapped leading and trailing end portions of the binding strap together. Japanese Patent Application Ser. No. 61-156727 discloses one example of an improved type of seal fitment or crimped ferrule. The use of such fitments or bonding means, however, requires the generation of large forces in order to develop the requisite mechanical deformation for achieving the bonding operation. Such large forces can only be generated within a binding head having a substantially large and rigid structure, and in addition, there is the likelihood that the articles being bound may be damaged by means of the seal fitment or ferrule, or the bonding structure or apparatus of the binding head.

Another conventionally known method of bonding overlapped portions of the binding strap encircled about the articles being bound comprises the use of spot welding techniques. Two examples of conventional spot-welding techniques employed in connection with the bonding together of overlapped binding strap end portions are disclosed within FIGS. 7 and 8, and in initially considering the conventional method of FIG. 7, the articles to be bound are disclosed at 3, while the encircling binding strap is disclosed at 1, the strap 1 being fed by suitable means, not shown, from a source of supply, also not shown, such that the strap 1 passes between cooperating blades of a cutting means 2. After the leading end portion 1' of the binding strap 1 has completely encircled the article 3 to be bound, and in particular, after the leading end portion 1' of the binding strap 1 has passed between cooperating jaws of a gripper 4, the forward feeding mode of the binding strap 1 is terminated, and the gripper means 4 is activated to its closed position so as to securely grip that portion of the binding strap 1 interposed therebetween. The roller drive means, not shown, which were previously utilized to feed the binding strap 1 in its forward feed mode is now actuated in its reverse driving mode so as to retract the trailing end portion 1" thereby tensioning the strap 1 about the article 3 being bound, and when the tension developed within the binding strap 1 attains a predetermined degree or value, the overlapped strap portions, comprising the leading end portion 1' and the trailing end portion 1", disposed downstream of the gripping means 4, are bonded to each other by means of a two-point spot-welding technique or operation.

More particularly, the apparatus for carrying out the spot-welding operation is seen to comprise a lower electrode plate 6 having a first polarity and including a back bar or support surface 5, plate 6 being interposed between the article 3 being bound and the underlying surface of the leading end portion 1' of the binding strap 1, and two electrode tips 7 and 8 of an opposite polarity and reciprocably mounted above the upper surface of the trailing edge portion 1" of the binding strap 1. The electrodes 7 and 8 are simultaneously lowered into engagement with the overlapped portions 1' and 1" of the binding strap 1, and upon energization thereof, the electrodes 7 and 8 perform a two-point spot-welding operation such that the overlapped portions 1' and 1" of the binding strap 1 are bonded together. Subsequently, the cutting means 2 is operated so as to sever and separate the bonded trailing edge portion 1" of the binding strap 1 from the residual supply portion of the binding strap 1.

Referring now to FIG. 8, a second conventional spot-welding operation, and apparatus for achieving the same, is disclosed, this particular process and apparatus being disclosed within West German Laid-Open Patent Publication No. 3508835. In accordance with this conventional system, the binding strap 1 is again fed from its source of supply, not shown, by means of drive rollers, also not shown, so as to completely encircle an article 3 to be bound, the trailing end portion 1" of the binding strap 1 passing between the cooperating blades of a cutting means 2 as well as between the jaws of a second gripping means 9 which is formed, in part, with a left-end portion of a back bar or support surface 5 of a lower electrode plate 6. When the leading end portion 1' of the binding strap 1 has completely encircled the article 3 being bound such that the leading end portion 1' of the binding strap 1 has passed between the jaws of the first gripper 4, the forward drive rotation of the feed rollers is terminated, and the leading end portion 1' of the binding strip 1 is gripped by means of the first gripping means 4 as a result of the jaws of the latter being activated to their closed position. The operative mode of the drive rollers, not shown, is then reversed such that the binding strap 1 is taken up, tightened, and ultimately tensioned with a high degree of tension about the article 3 being bound, whereupon the jaws of the second gripping means 9 are activated to their closed position so as to fixedly clamp the trailing end portion 1" of the binding strap 1. The cutting means 2 is then activated so as to sever and separate the trailing end portion 1" of the binding strap 1 from the residual supply portion of the binding strap 1, and subsequently, the overlapped binding strap portions 1' and 1", clamped between both gripping means 4 and 9, are bonded to each other by means of a two-point spot welding technique or operation. More particularly, the spot-welding operation is achieved by means of the use of a lower electrode plate 6 of a first polarity, and including the back bar or support surface 5, plate 6 being interposed between the article 3 being bound and the leading end portion 1' of the binding strap 1, and two electrode tips 7 and 8, of an opposite polarity, which are reciprocably disposed above the trailing end portion 1" of the binding strap 1. Upon lowered engagement of the electrodes 7 and 8 with the overlapped portions 1' and 1" of the binding strap 1, and upon energization of the electrodes, a two-point spot-welding operation is performed such that the overlapped portions 1' and 1" of the binding strap 1 are bonded to each other.

In accordance with the first conventional spot-welding operation or technique, the overlapped portions of the binding strap are bonded together by simultaneously performing spot-welding operations at the two laterally spaced locations at predetermined welding strength values depending upon, for example, the particular material comprising the strapping band, the thickness thereof, and the like. Accordingly, a large amount of electric current is required in order to simultaneously achieve the spot-welding operations at the two laterally spaced locations. In addition, the energization of the electrodes is not conducted in a continuous manner, but to the contrary, is conducted in an intermittent manner, and within a relatively short period of time. Consequently, a large-sized power installation is required in view of the control characteristics to be achieved. In addition, the simultaneous two-point spot-welding operations are conducted under high-tension conditions prevailing within the binding strap, and with a gap formed between the two overlapping end portions 1' and 1" of the binding strap 1 due to the interdisposition of the upper gripper jaw, which also forms one part of the cutting means 2, between the upper surface of the leading end portion 1' of the binding strap 1 and the lower surface of the trailing end portion 1" of the binding strap 1. Accordingly, there is a great likelihood that the welded portions of the bonded strap 1 will crack, thereby failing to assure a perfect or proper weld. Still yet further, it is often difficult to insure that both electrode tips will come into contact with the overlapped strap portions in a simultaneous manner at both laterally spaced locations. Accordingly, sparks may be generated at one or both electrode locations thereby causing the electrode tip portions to be consumed. In order to prevent such from occurring, it is often required to adjust the relative positions or relationship defined between the two electrode tips. Yet still further, since a substantially large force is required in order to properly pressurize the overlapped strap portions together by means of the electrode tips, the back bar should have a substantially large amount of strength which means that the thickness thereof must be relatively large. This of course reduces the residual tension remaining within the bonded binding strap after the back bar has been removed.

In accordance with the second conventional spot-welding technique or operation, both the leading end and trailing end portions of the binding strap are gripped by means of the grippers 4 and 9 after the binding strap has been tensioned to its desired degree. The portion of the trailing end portion of the binding strap 1 which is interposed between the two gripping means 4 and 9 is then severed at the end thereof which is disposed within the vicinity of the first gripping means 4 such that the trailing end portion 1" of the binding strap is separated from the residual supply portion thereof. Consequently, the overlapped portions 1' and 1" of the binding strap 1 are disposed within the spot-welding region under a virtually tenion-free state whereupon the spot-welding bonding of the same by means of the two-point spot welding technique is able to be performed. Accordingly, many of the problems characteristic of the prior art system and techniques disclosed in accordance with the first conventional method, other than the fact that a large amount of electrical current or power is still required, have been overcome or resolved, and good welding properties, including good welding strength, are achieved. However, it is readily seen that the required provision and disposition of two gripping means disposed at opposite ends of the back bar 5 requires a large gripping, cutting, and bonding region, as well as a large back bar per se. Removal of such large back bar 5 subsequent to completion of the spot-welding bonding operation will of course result in a considerable reduction of the residual tension maintained within the bonded binding strap thereby reducing the binding strength of the strap with respect to the article being bound. Still further, when it is desired to bind articles having a circular cross-section, such as, for example, strip coils, pipes, tubes, and the like, it is difficult to employ a large-sized back bar.

OBJECT OF THE INVENTION:

Accordingly, it is an object of the present invention to provide a new and improved method of bonding together two overlapped portions of a binding strap by means of spot-welding whereby the problems characteristic of the prior art spot-welding techniques will be overcome or minimized.

SUMMARY OF THE INVENTION:

The foregoing and other objects of the present invention are achieved through the provision of a new and improved method of spot-welding the overlapped portions of the binding strap at two different, laterally spaced locations but by means of the use of a single electrode tip. More particularly, the method of the present invention comprises the performance of two spot-welding operations at two laterally spaced locations, with respect to the overlapped portions of the binding strap, by means of a single electrode tip which is sequentially moved from the first location to the second location. Such welding operations may still further be achieved at the predetermined spot-welding locations at predetermined times with respect to the basic series of binding steps normally performed in connection with the binding of articles by means of a binding strap, and the performance of such spot-welding operations, in connection with the performance of the basic binding steps, and the particular timed relationship between the performance of such operations, does not adversely affect or render inconvenient the binding operations per se, nor deleteriously affect the spot-welding operations and the quality of the welds achieved.

In accordance with the bonding method of the present invention for bonding article binding straps by means of spot-welding techniques or operations, the binding strap is conventionally conveyed so as to encircle the article to be bound, and when the binding strap has completely encircled the article to be bound, the leading end portion of the binding strap is gripped and secured while the trailing end portion of the binding strap is retracted in a reverse conveyance mode by means of the reverse drive of the driving rollers so as to initially tighten and subsequently tension the binding strap about the article being bound to a predetermined tensioned state. Subsequently, while the bound article is in this state, a single electrode tip disposed above the overlapped portions of the binding strap is lowered so as to engage the overlapped portions of the binding strap and pressurize the same into forced surface contact with each other, and undersurface electrode plate and back bar being used in combination with the electrode tip. The electrodes are then energized so as to perform a spot-welding operation upon the overlapped portions of the binding strap at a first position which is located at a point remote from the location at which the leading end portion of the binding strap is gripped. In this manner, the overlapped portions of the binding strap are disposed in good surface contact with each other without any intervening gaps being defined therebetween as is conventionally present due to the close proximity, in the conventional system, of the binding strap leading end portion gripping means to one of the spot welding locations. As a result, a good quality spot-weld is achieved.

Subsequently, the cutting means may be activated so as to sever and separate the trailing end portion of the binding strap from the residual supply portion of the binding strap. In view of the fact that the first spot-welding operation has already been completed, which effectively secures the binding strap in its tensioned state about the article being bound, tension no longer exists within the trailing end portion of the binding strap defined between the first spot-welding location and the location at which the binding strap was severed by means of the cutting device. Consequently, the electrode tip can now be moved to a second spot-welding location close to the free cut end of the binding strap whereupon energization of the electrodes, a second spot-welding operation is performed so as to complete the entire strap binding operation. It is to be noted that in view of the tension-free state of the trailing-end portion of the binding strap defined between the first spot-welding location and the cutting device, as well as the freedom of such trailing end portion of the binding strap from the cutting device, that is, the cutting device is no longer, in effect, interposed between the leading and trailing end portions of the binding strap, the overlapped portions of the binding strap are again in complete surface contact with each other whereby good spot-welding results can be achieved.

As a variant embodiment of the present invention method, the trailing end portion of the binding strap need not be necessarily severed from the residual supply portion of the binding strap prior to the performance of the spot-welding operation at the second location, but may in fact be severed and separated after the completion of the second spot-welding operation, with equally beneficial results being obtained. The reason for this resides in the fact that upon completion of the first spot-welding operation at the location remote from the cutting and gripping location, tension within the bound strap encircling and binding the article is secured by means of the first spot-welding operation. Consequently, tension within the trailing end portion of the binding strap which is still connected to the residual supply portion of the binding strap, and which is disposed upstream of the first spot-welding location, may effectively be relaxed whereby when the single electrode tip is moved to the second spot-welding location and is subsequently moved into engagement with the overlapped portions of the binding strap so as to interpose the overlapped portions of the binding strap between the single electrode tip and the undersurface electrode plate and back bar, the relaxed tension state existing within the trailing end portion of the binding strap permits good surface contact to be achieved between the overlapped portions of the binding strap despite the fact that the portion of the gripper/cutter is still interposed between the leading and trailing end portions of the binding strap. Accordingly, a good quality weld can likewise be achieved at the second spot-welding location.

BRIEF DESCRIPTION OF THE DRAWINGS:

Various other objects, features, and attendant advantages of the present invention will be more fully appreciated from the following detailed description when considered in connection with the accompanying drawings, in which like reference characters designate like or corresponding parts throughout the several views, and wherein:

FIG. 6 is a view similar to that of FIG. 5, illustrating, however, the withdrawal or vertical retraction of the single electrode tip upon completion of the second spot-welding operation;

FIG. 7 is a view similar to that of FIG. 1, illustrating, however, a first type of PRIOR ART spot-welding system and the two-point spot-welding operation performed thereby.

Figure 1:
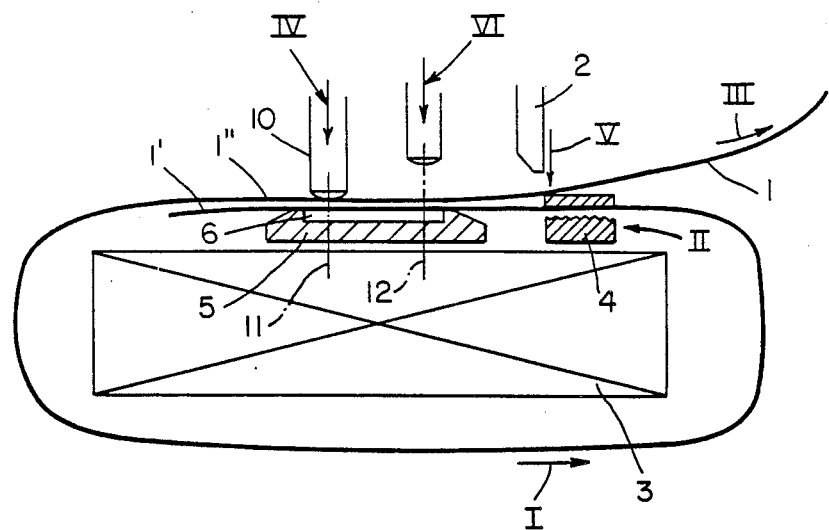
FIG. 1 is a schematic view of the spot-welding system employed in connection with the principles of the present invention in order to carry out the various steps of the method performed in accordance with the present invention.
Figure 2:
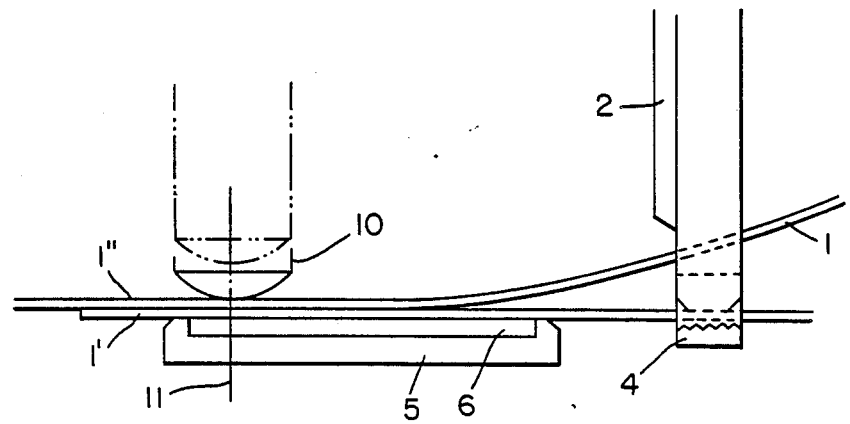
FIG. 2 is an enlarged schematic view of a portion of the system illustrated within FIG. 1 and illustrating the performance of the first spot-welding operation.
Figure 3:
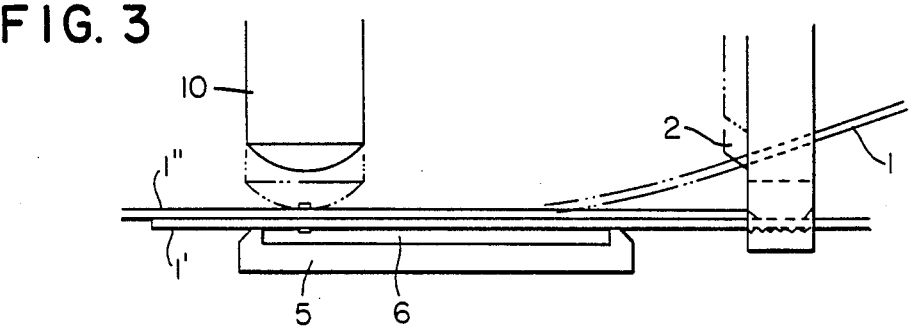
FIG. 3 is a view similar to that of FIG. 2, showing, however, the severance of the trailing end portion of the binding strap from the residual supply portion of the binding strap subsequent to completion of the first spot-welding operation.

DETAILED DESCRIPTION OF THE ILLUSTRATED EMBODIMENTS:

Referring again to the drawings, and more particularly to FIGS. 1-6 thereof, the two-point spot-welding operation or method developed in accordance with the principles of the present invention will now be described. A binding strap 1 is initially fed in a forward direction, as denoted by the arrow I, by means of reversible feed rollers, not shown, such that the strap 1 completely encircles an article 3 to be bound. It is further noted in connection with the feeding of the strap 1 that the leading end portion 1' initially passes between the cooperating blades of a cutting means 2, and upon substantially encircling the article 3 to be bound, also passes through the cooperating jaws of a gripping device 4. Forward feeding of the binding strap 1 is terminated when the leading end portion 1' of the binding strap 1 is disposed in overlapped relationship beneath the trailing end portion 1" of the binding strap 1. Subsequently, the gripping means 4 is activated so as to tightly grip the leading end portion 1' of the strap 1, and the trailing end portion 1" of the strap 1 is then retracted by means of the feed rollers being driven in their reverse mode so as to tighten and tension the strap 1 about the article 3 being bound.

While the strap 1 is disposed in this tensioned state, the overlapped end portions 1' and 1" of the strap 1 are to be bonded to each other so as to perfect binding of the article 3 to be bound, and in order to perform the bonding operation upon the overlapped portions 1' and 1" of the strap 1, which in accordance with the present invention, comprises a two-point spot-welding process, an undersurface electrode plate 6, having a first polarity and including a back bar 5, is interposed between the article 3 being bound and the undersurface portion of the leading end portion 1' of the binding strap 1, while a single electrode tip 10 is reciprocably movably disposed above the upper surface of the trailing end portion 1" of the binding strap 1. In order to perform the spot-welding operations upon the overlapped portions 1' and 1" of the binding strap 1, the single electrode tip 10, having a polarity opposite that of electrode plate 6, is initially disposed at a first spot-welding location 11, which is remote from the location of the cutting and gripping devices 2 and 4, respectively, and is vertically lowered so as to cooperate with the back bar 5 of the electrode plate 6 in, in effect, compressing the overlapped portions 1' and 1" of the binding strap 1 therebetween and into good surface contact with each other. The electrodes 10 and 6 are then energized in order to perform a first spot-welding operation at location 11, and upon completion of the first spot-welding operation, the electrode 10 is raised from its lowered engaged-welding position of FIG. 2 to that of FIGURE 3. At this time, as is also seen from FIG. 3, the cutting means 2 is actuated so as to sever and separate the trailing end portion 1" of the binding strap 1 from the residual supply portion of the binding strap 1.

Figure 4:
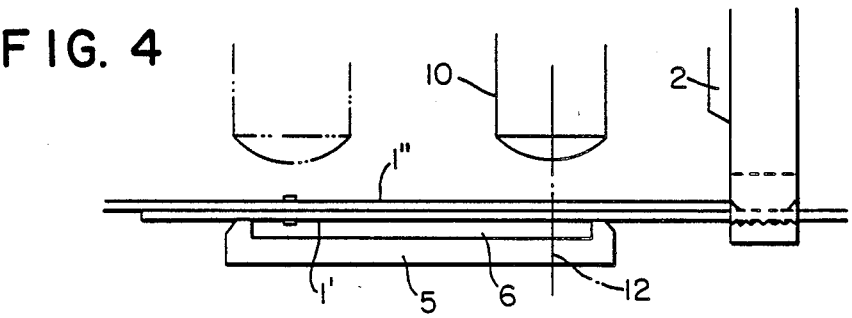
FIG. 4 is a view similar to that of FIG. 2, showing, however, the movement of the single electrode tip from the first spot-welding location to the second spot-welding location after completion of the cutting operation illustrated in FIG. 3.
Figure 5:
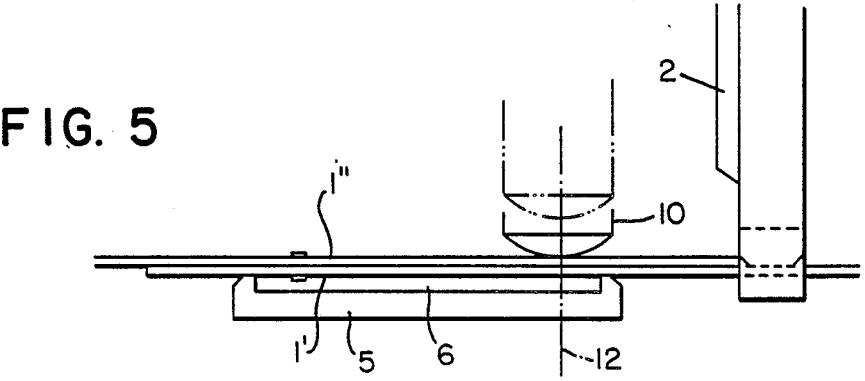
FIG. 5 is a view similar to that of FIG. 2, illustrating, however, the performance of the second spot-welding operation.
Figure 8:
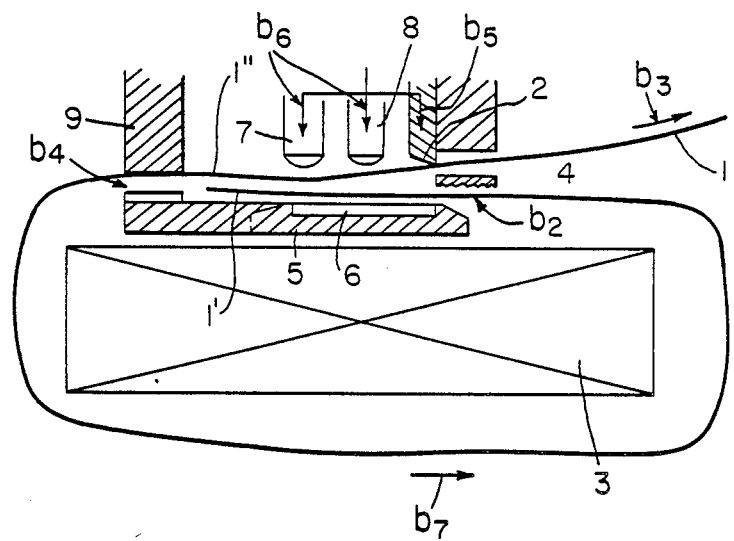
FIG. 8 is a view similar to that of FIG. 7, illustrating, however, a second type of PRIOR ART spot-welding system and the two-point spot-welding operation performed thereby.

With continued reference now being made to FIG. 4, the electrode tip 10 is moved from its first spot-welding location 11 to a second spot-welding location 12 which is located closer to the cutting and gripping devices 2 and 4, respectively, and as is further illustrated in FIG. 5, the electrode tip 10 is again lowered so as to cooperate with the back bar 5 of electrode 6 in compressing the overlapped portions 1' and 1" of binding strap 1 into good surface contact with each other whereby upon energization of the electrodes 10 and 6, a good surface spot-welding operation is able to be performed. Upon completion of the second-location spot-welding operation, the electrode 10 is again elevated to its initial position as shown in FIG. 6.

In accordance with the present invention method and operations, it is to be appreciated that in view of the fact that the first-location spot-welding operation is carried out or performed at the first remote location 11, with respect to the upstream remote location of the cutting means 2 and the gripping means 4, whereby the overlapped portions 1' and 1" of the binding 1 are separated from each other by means of the thickness of the lower cutting blade, which also forms the upper gripping member, the remote disposition of the first spot-welding location effectively negates the spacing or gap defined between the upstream overlapped portions 1' and 1" of the binding strap 1 within the vicinity of the cutting and gripping devices 2 and 4, respectively, whereby good surface contact is in fact developed between the overlapped binding strap portions 1' and 1" by means of the cooperating electrodes 10 and 6 so as to insure the development of a good, proper, and reliable spot-weld. In addition, since the overlapped portions 1' and 1" of the binding strap 1 are compressed into contact with each other relatively easily, only a relatively small compression force is required whereby the strength, size, mass, and the like of the back bar portion 5 of the electrode 6 can be minimized.

Continuing further, when the trailing end portion 1" of the binding strap 1 is severed and separated from the residual supply portion of the strap 1, only the first spot-weld retains the bound binding strap 1 in its bound tensioned state. Consequently, if the first spot-weld should prove to be defective in any manner, the overlapped portions 1' and 1" of the binding strap 1 will separate under the residual tension previously developed within the bound binding strap. Consequently, the defective welding is detected during this early stage of processing whereby such problem can be readily rectified.

It is further appreciated that in view of the fact that the trailing end portion 1" of the strap 1 has been previously severed and separated from the residual supply portion of the strap 1, and prior to the performance of the second spot-welding operation, the latter is performed under no-load or no-tension conditions whereby the overlapped strap portions 1' and 1" are disposed in good surface contact with each other as illustrated in FIGS. 4-6. Consequently, good and sure spot-welding results can be obtained.

In accordance with a variant embodiment of the method of the present invention, the trailing end portion 1" of the binding strap 1 can be severed and separated from the residual supply portion of the strap 1 after performance of the second spot-welding operation at location 12, and with similarly good spot-welding results. The reason for this is that, again, as a result of the first spot-welding operation performed at the remote location 11, the tensioned state of the encircled bound binding strap 1 is maintained by means of the first spot-welding together of the overlapped portions 1' and 1" of the strap 1. Consequently, tension within the trailing end portion 1" of the strap 1, as disposed upstream of the first spot-welding location 11, and certainly within the vicinity of the second spot-welding location 12, is effectively relaxed whereby good surface contact between the overlapped portions 1' and 1" of the strap 1 can nevertheless be achieved despite the continued presence of the cutting/gripping means 2/4 interposed between the overlapped portions 1' and 1" of the strap 1 at the cutting/ gripping station. The mode of operation in accordance with this embodiment can of course be readily achieved by altering the control sequence of the binding and welding apparatus.

It is thus apparent that the present invention method embodies several important advantages over or with respect to the prior art methods. For example, it is initially noted that in accordance with the present invention, only one-point, sequential spot-welding operations are performed, at two different locations, as opposed to simultaneous two-point spot-welding operations. Consequently, a large amount or capacity of electrical current is not required, and therefore, a smallsized power installation will suffice. In addition, the compression force required to develop good surface contact between the overlapped binding strap portions is relatively small whereby the thickness and compression strength or resistance of the electrode plate back bar is able to be reduced. A thinner back bar increases the residual tension within the bound binding strap encircling the article being bound upon removal of the back bar from its position interposed between the article being bound and the undersurface of the leading end portion 1' of the binding strap 1. Still further, as a result of the remote location of the first spot-welding operation with respect to the gripping and cutting station, as well as the performance of the second spot-welding operation under, in effect, no load or no-tension conditions, good surface contact is developed between the overlapped portions of the binding strap thereby facilitating good welding results. Lastly, in view of the fact that the present invention embodies the use of a single electrode tip movable between two spot-welding locations, as opposed to the use of a dual-electrode operated in a single mode for simultaneous performance of the spot-welding operations at the two welding locations, the requirement for pressurizing the overlapped strap portions in a balanced mode, or the need for positionally adjusting the electrodes with respect to each other so as to properly and uniformly contact or engage the overlapped portions of the binding strap, is effectively obviated. Still further, the likelihood of spark generation is also effectively eliminated, thereby increasing the service life of the electrode tip.

Obviously, many modifications and variations of the present invention are possible in light of the above teachings. It is therefore to be understood that within the scope of the appended claims, the present invention may be practiced otherwise than as specifically described herein.

What is claimed is:

1. A bonding method for bonding over-lapped leading and trailing strap end portions to each other by spot-welding operations, comprising the steps of:
   winding a binding strap around an article to be bound;
   gripping a portion of said strap disposed upstream of said leading end portion of said strap at a strap gripping station;
   tensioning said binding strap by retracting a residual supply portion of said binding strap disposed upstream of said trailing end portion of said binding strap;
   lowering an electrode from an upper position and into contact with said overlapped strap end portions so as to pressurize said overlapped strap portions together with an undersurface electrode plate;
   energizing said electrode and said undersurface electrode plate so as to carry out a spot-welding operation at a first spot-welding position remote in the downstream direction from said strap gripping station after said binding strap has been gripped at said portion disposed upstream of said leading end portion of said binding strap and after said binding strap has been tensioned;
   moving said electrode laterally to a second spot-welding position so as to carry out a spot-welding operation at a second spot-welding position adjacent to said strap gripping station; and
   cutting said trailing end portion of said binding strap from said residual portion of said binding strap after said spot-welding operation at said second spot-welding position is carried out.

2. A method as set forth in claim 1, wherein:
   said undersurface electrode plate is interposed between said overlapped end portions of said binding strap and said article to be bound.

3. A method for bonding overlapped leading and trailing end portions of a binding strap to each other by spot-welding operations, comprising the steps of:
   winding said binding strap around an article to be bound;
   gripping a portion of said binding strap disposed upstream of said leading end portion of said binding strap at a strap gripping station;
   tensioning said binding strap by retracting a residual supply portion of said binding strap disposed upstream of said trailing end portion of said binding strap;
   lowering an electrode from an upper position into contact with said overlapped end portions of said binding strap so as to pressurize said overlapped end portions of said binding strap as a result of cooperation with an electrode plate disposed beneath said overlapped end portions of said binding strap;
   energizing said electrode and said electrode plate so as to carry out a first spot-welding operation at a first spot-welding position remote from said strap gripping station after said portion of said binding strap disposed upstream of said leading end portion of said binding strap has been gripped at said gripping station and after said binding strap has been tensioned;
   cutting said trailing end portion of said binding strap from said residual portion of said binding strap; and
   subsequently moving said electrode laterally to a second spot-welding position so as to carry out a second spot-welding operation at said second spot-welding position which is adjacent to said strap-gripping station.

4. A method as set forth in claim 3, wherein:
   said undersurface electrode plate is interposed between said overlapped end portions of said binding strap and said article to be bound.

* * * * *